(No Model.)
H. ADAMS & C. C. HAYNES.
GATHERING TUB.
No. 301,467. Patented July 8, 1884.
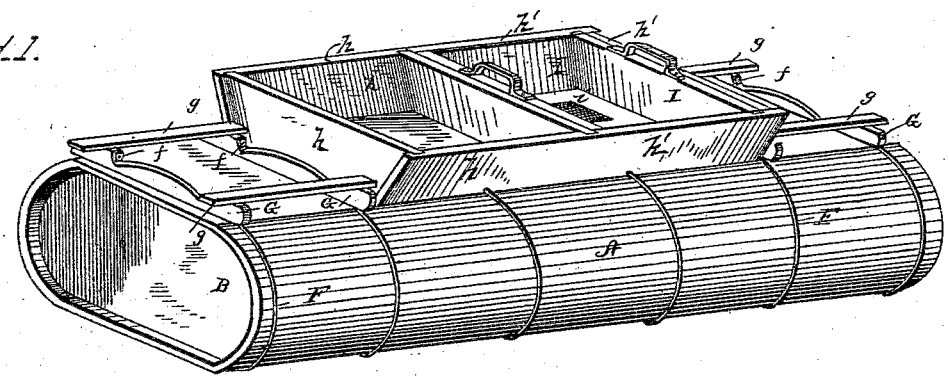
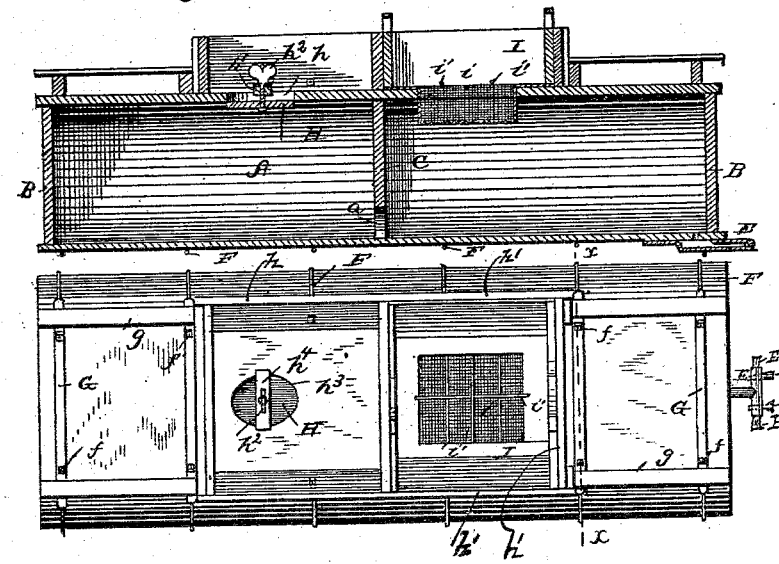
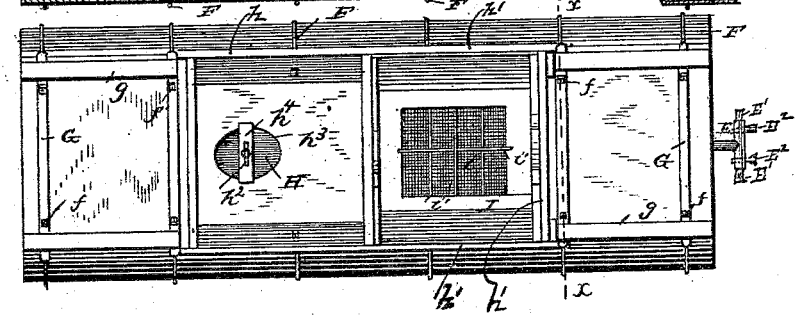
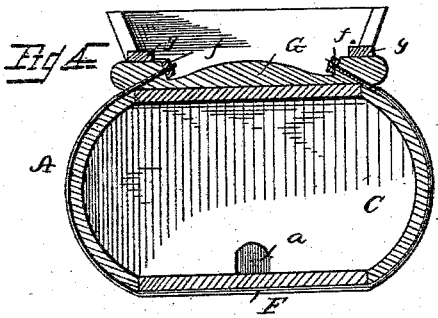 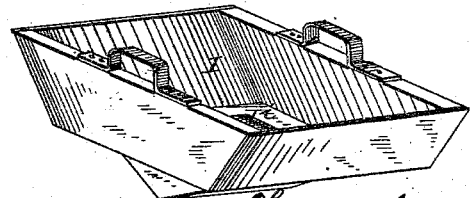
WITNESSES
F. L. Durand
E. G. Siggers.
Henry Adams
Clinton C. Haynes
INVENTORS
by C. A. Snow & Co.
Attorneys

UNITED STATES PATENT OFFICE.

HENRY ADAMS AND CLINTON C. HAYNES, OF WILMINGTON, VERMONT.

GATHERING-TUB.

SPECIFICATION forming part of Letters Patent No. 301,467, dated July 8, 1884.

Application filed April 24, 1884. (No model.)

*To all whom it may concern:*

Be it known that we, HENRY ADAMS and CLINTON C. HAYNES, citizens of the United States, residing at Wilmington, in the county of Windham and State of Vermont, have invented a new and useful Gathering-Tub, of which the following is a specification, reference being had to the accompanying drawings.

Our invention relates to a tank designed for use to serve as a receptacle for storing maple-sap, water, and also as a receiving-tank in cider-mills, the object being to furnish a cheap and effective tank for the purpose of gathering sap collected from the sugar-maple, for hauling water to feed portable engines, watering cattle, and for other like purposes, and one that shall possess superior advantages in point of utility and general usefulness over the tubs or barrels in common use for the purposes described.

With these ends in view the invention consists in the improved construction and combinations of parts hereinafter fully described, and pointed out in the claim.

In the drawings, Figure 1 is a perspective view of my improved tank. Fig. 2 is a longitudinal section. Fig. 3 is a plan view. Fig. 4 is a transverse section on the line $x\,x$ of Fig. 3, and Fig. 5 is a detail view of the strainer.

In the accompanying drawings, in which like letters of reference refer to corresponding parts in the several figures, A represents the tank, which is constructed elliptical in cross-section, and having the heads or ends B. This tank A is divided into two parts at about its center by a board, C, having at its lower end a passage or opening, $a$, by the use of which board all sloshing of the water, sap, or other liquid contained therein is obviated. One of the ends of the tank A is provided with an opening, in which is seated a cock, E, the end of which is provided with a cross-arm having two openings—one at each end of said cross-arm—each of said openings being stopped by a plug, E', or turning-plug E², or other well-known means.

F represents hoops or bands, which are screw-threaded at their ends, which ends pass through openings in connecting-strips G upon the upper side of the tank, and are held in position by means of nuts $f$, whereby said hoops or bands may be tightened on the tank when necessary, as in the case of shrinkage. The strips G, connecting the ends of the hoops or bands, are braced by cross rods or beams $g$.

At about the center of the tank A, and upon the upper side thereof, are provided two compartments, $h$ and $h'$, through the sides of which pass the bands that are located at about the center of the tank, the said hoops or bands being secured to the sides of said compartment by means of nuts, as in the case of the connecting-strips G. The upper side of the tank is provided with an opening, $h^3$, within one of the compartments, said opening being closed by a head, H, having an upwardly-projecting screw, upon which is mounted a cross-strip, $h^4$, which is adapted to fit over the opening upon the outer side thereof, and is clamped securely against the sides of said opening by means of a thumb-nut, $h^2$. The compartment $h'$ is provided with an enlarged and preferably square opening. Within the compartment $h'$ is provided a casing, I, which is provided with handles for its ready removal. The bottom of this casing is provided with an opening, $i$, across which are placed rods $i'$. From the sides of this opening of the casing extend downwardly and meet at a point a slight distance within the tank two pieces of netting, preferably of wire, which form a strainer, the end sides of said strainer being fastened to depending plates secured at their upper ends to the bottom or floor of the casing I.

In the operation of the above-described device the sap or other substance is poured in the casing I, and thence passes to the tank through the strainer. In using the compartment $h$ snow, or ice, to be melted for use in watering cattle or for other purposes, is placed in said compartment and the head E slightly loosened, which, while it allows the water dripping from the snow or ice to pass into the tank, will not allow of the entrance of solids.

If desired to draw water from the tank, the strainer is removed, and a bucket or pail may be inserted therein and the water readily obtained.

From the above description it will be apparent that our device is simple in construction, may be readily transported, and that by the use of the screw-threaded bands and securing-nuts the same may be readily tightened, in the case of shrinkage of the tank, with but little trouble.

Having fully described our invention, what we claim as new, and desire to secure by Letters Patent, is—

The combination, with the tank or tub A, having a compartment or hopper arranged upon the upper side thereof, and provided with an opening, as shown, of a strainer arranged in said compartment and extending below said opening into the tank or tub, substantially as set forth.

In testimony that we claim the foregoing as our own we have hereto affixed our signatures in presence of two witnesses.

HENRY ADAMS.
CLINTON C. HAYNES.

Witnesses:
B. S. BARNARD,
A. H. HALLADAY.